United States Patent [19]

Otten et al.

[11] 4,334,031
[45] Jun. 8, 1982

[54] FLAME-RETARDANT POLYURETHANE FOAM PREPARED BY INCORPORATING A GRAFT POLYMER HAVING A PARTICLE SIZE GREATER THAN 0.5 MICRON

[75] Inventors: Jay G. Otten, Flat Rock; Duane A. Heyman, Monroe, both of Mich.; John R. Murphy, Wayne, Pa.

[73] Assignee: BASF Wyandotte Corporation, Wyandotte, Mich.

[21] Appl. No.: 224,352

[22] Filed: Jan. 12, 1981

[51] Int. Cl.$^3$ .............................................. C08G 18/14
[52] U.S. Cl. .................................... 521/106; 521/107; 521/108; 521/114; 521/123; 521/131; 521/137; 521/174; 521/176
[58] Field of Search ............... 521/107, 108, 114, 106, 521/123, 131, 137, 174, 176

[56] References Cited

U.S. PATENT DOCUMENTS

| | | | |
|---|---|---|---|
| 3,875,258 | 4/1975 | Patton et al. | 528/303 |
| 4,022,718 | 5/1977 | Russo | 521/160 |
| 4,147,847 | 4/1979 | Schweiger | 521/155 |
| 4,162,353 | 7/1979 | Papa et al. | 521/107 |
| 4,258,148 | 3/1981 | Chandalia et al. | 521/137 |
| 4,278,770 | 7/1981 | Chandalia et al. | 521/137 |

*Primary Examiner*—Maurice J. Welsh
*Attorney, Agent, or Firm*—Norbert M. Lisicki

[57] ABSTRACT

In the preparation of conventional or high resiliency flexible polyurethane flame retarded foams by reacting organic polyisocyanates with polyols containing vinylic polymers and employing flame retardant compounds, less flame retardant compound is required to pass the California Bulletin No. 117 flame test when the particle size of the vinylic polymers is greater than 0.5 microns.

6 Claims, No Drawings

FLAME-RETARDANT POLYURETHANE FOAM PREPARED BY INCORPORATING A GRAFT POLYMER HAVING A PARTICLE SIZE GREATER THAN 0.5 MICRON

BACKGROUND OF THE INVENTION

1. Field of the Invention

The present invention pertains to flexible foam compositions and in particular to flexible polyurethane flame-retarded foam compositions and methods for the preparation thereof. More particularly, the present invention relates to the preparation of flexible polyurethane flame-retarded foam compositions which contain an effective amount of a flame retardant compound and a graft polymer dispersion having a vinyl particle size greater than 0.5 micron.

2. Description of the Prior Art

The preparation of flexible polyurethane flame-retardant foam compositions are generally well known as evidenced by the following prior art. U.S. Pat. No. 4,022,718 teaches the preparation of high resilience cold-cured polyurethane foams incorporating 2,3-dibromo-1,4-butanediol as a chain extender and flame-retardant component. U.S. Pat. No. 4,147,847 teaches a method of preparing flexible, flame-retarded, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chlorethyl)-phosphate and an unsubstituted trialkylphosphate such as, for example triethylphosphate.

U.S. Pat. No. 3,875,258 teaches the preparation of graft polymer dispersions in polyols employing monomers which have incorporated phosphorus and halogen in order to prepare urethane compositions having flame-retarding properties. The use of graft polymer polyol dispersions in flexible foams often necessitates the use of larger amounts of flame retardants to meet specific flammability tests, such as the California Bulletin No. 117 flame test, than is normally required for foams based on conventional polyether polyols. These higher levels of flame retardant result in higher foam costs and can result in foam processing difficulties. The present invention is directed to solving the problem involved in preparing flame-retarded graft polymer polyol containing polyurethane foams.

SUMMARY OF THE INVENTION

The present invention applies to both high-resiliency, flexible polyurethane foam compositions and conventional flexible polyurethane foam compositions which are prepared by the reaction of an organic compound having at least two active hydrogen atoms and having therein a vinylic polymer content with an organic polyisocyanate in the presence of an effective amount of a flame retardant compound. The amount of flame retardant compound required may be significantly decreased if the graft polymer dispersions have a vinyl particle size greater than 0.5 micron.

For a more complete understanding of the present invention, reference is made to the following detailed description and the examples thereof.

DESCRIPTION OF THE PREFERRED EMBODIMENTS

It has unexpectedly been found that, in the preparation of flexible flame-retarded polyurethane foam products which have incorporated therein vinylic polymers, the amount of flame retardant compound necessary to impart flame retardancy may be reduced if the graft polymer dispersion has a vinyl particle size greater than 0.5 micron. Among the flame retardant compounds which may be employed are ANTIBLAZE 19, reputed to have the following structure

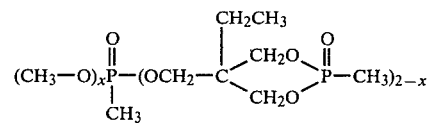

wherein x is equal to 0 or 1; ANTIBLAZE 78, reputed to be bis-(2-chloroethyl) 2-chloroethylphosphonate, THERMOLIN 101, reputed to be tetrakis(2-chloroethyl)ethylene diphosphate, FE 55, FIREMASTER LVT23P, reputed to be tris-2,3-dibromopropyl phosphate, BROMOCHLOR 50, WILTROF HF, CITEX BC26, FYROL PCF, FYROL FR2, FYROL EFF, BCL 462, PHOSFLEX 500, BROMINEX 161, FIREMASTER 901, FR 212, FR 1138, PHOSGARD 2XC20, reputed to have the structure

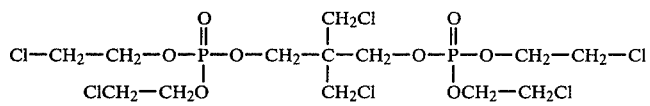

BC 48, PHOSGARD C-22R, reputed to have the structure

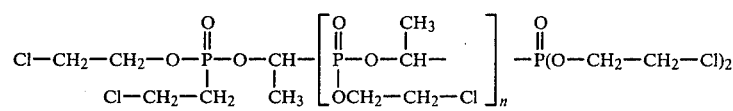

wherein n is 1–4, BROMINEX 214P, BROMINEX 257, and FYROL 99. Other compounds which may be employed include tris-(1,3-dichloropropyl) phosphate, tris-(chloroethyl) phosphate, molybdenum trioxide, ammonium molybdate, ammonium phosphate, pentabromodiphenyloxide, tricresyl phosphate, 2,3-dibromopropanol, hexabromocyclododecane, and dibromoethyldibromocyclohexane. Those preferred are bis-(2-chloroethyl)-2-chloroethylphosphonate, THERMOLIN 101 reputed to be tris-(2,3-dibromopropyl) phosphate, and tetrakis-(2-chloroethyl)ethylene diphosphate, PHOSGARD C-22R, PHOSGARD 2XG20, FYROL FR2, FYROL CEF, FYROL EFF. The quantities of flame retardant employed may range from 0.25 part to 25 parts per 100 parts of polyoxyalkylene polyether polyol.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092, 4,014,846, 4,093,573, and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. No. 3,652,659 and U.S. Pat. No. Re. 29,014 may be employed in preparing the graft polymer dispersions used in the instant invention, the disclosures of which are incorporated by reference. Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557, the disclosures of which are incorporated by reference.

Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid.

Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol and sucrose. Also included within the term "polyhydric alcohol" are compounds derived from phenol such as 2,2'-bis(4,4'-hydroxyphenyl)-propane, commonly known as Bisphenol A.

Any suitable polyoxyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Those preferred are the ethylene, propylene and butylene oxide adducts of ethylene glycol, propylene glycol, butylene glycol, glycerol, 1,1,1-trimethylolpropane, 1,1,1-trimethylolethane, 1,2,6-hexanetriol, α-methyl-glucoside, pentaerythritol, sorbitol, 2,2'-(4,4'-hydroxyphenyl)propane and sucrose, and mixtures thereof with equivalent weights from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylenedianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in preparing the graft copolymer dispersions. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenyl sulfide, p-vinylphenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(β-chloroethyl) vinylphosphonate, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, di-α-cumyl peroxide, dipropyl peroxide, diisopropyl peroxide, isopropyl-t-butyl peroxide, butyl-t-butyl peroxide, difuroyl peroxide, ditriphenylmethyl peroxide, bis(p-methoxybenzoyl) peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α-α'-azo-bis(2-methyl) butyronitrile, α,α'-azo-bis(2-methyl) heptonitrile, 1,1'-azo-bis(1-cyclohexane) carbonitrile, dimethyl α,α'-azo-bis(isobutyronitrile), 4,4'-azo-bis(4-cyanopetanoic) acid, azo-bis(isobutyronitrile), 1-t-amylazo-1-cyanocyclohexane, 2-t-butylazo-2-cyano-4-methoxy-4-methylpentane, 2-t- butylazo-2-cyano-4-methylpentane, 2-(t-butylazo)isobutyronitrile, 2-t-butylazo-2-cyanobutane, 1-cyano-1-(t-butylazo)cyclohexane, t-butyl peroxy-2-ethylhexanoate, t-butylperpivalate, 2,5-dimethyl-hexane-2,5-diper-2-ethyl hexoate, t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally, from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840 which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol as disclosed in copending applications Ser. No. 179,136 filed Aug. 18, 1980, and Ser. No. 179,137 filed Aug. 18, 1980.

The conventional polyurethane foams employed in the present invention are generally prepared by the reaction of a polyoxyalkylene polyether polyol having a graft polymer content of at least 5 parts per 100 parts of polyol at least 3 parts by weight per 100 parts of polyol for high resiliency polyurethane foams with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is employed to produce a blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoromethane, trichlorofluoromethane, dichlorofluoroethane, vinylidene chloride, dichlorofluoromethane, dichloromethane, trichloromethane, dichlorofluoroethane, trichlorotrifluoromethane, hexafluorocyclobutane, and octafluorocyclobutane, may be used as blowing agents.

Organic polyisocyanates which may be employed include aromatic, aliphatic, and cycloaliphatic polyisocyanates and combinations thereof. Representative of these types are the diisocyanates such as 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis-(isocyanatohexyl) sulfide, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluenediisocyanate, 2,6-toluenediisocyanate, mixtures of 2,4- and 2,6-toluene diisocyanate, 1,6-hexamethylenediisocyanate, 1,4-tetramethylenediisocyanate, 1,4-cyclohexanediisocyanate, hexahydrotoluene diisocyanate (and isomers), 1,5-naphthylenediisocyanate, 1-methoxy-2,4-phenylenediisocyanate, 4,4'-diphenylmethanediisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluenetriisocyanate; and the tetraisocyanates such as 4,4'-dimethyl-2,2',5,5'-diphenylmethanetetraisocyanate. Especially useful due to their availability and properties are toluene diisocyanate, 2,4'-diphenylmethanediisocyanate 4,4'-diphenylmethanediisocyanate and polymethylene polyphenylene polyisocyanate.

Crude polyisocyanate may also be used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The graft polymer polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the polyisocyanate than does water. These include phenylenediamine, ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used for the preparation of polyurethanes in accordance with this invention including, for example, triethylenediamine, N-methylmorpholine, N-ethylmorpholine, diethylaminoethanol, N-laurylmorpholine, 1-methyl-4(dimethylaminoethyl)-piperazine, 3-methoxy-N,N'-dimethylpropylamine, N,N,N'-trimethylisopropylpropylenediamine, N,N,N',N'-tetraethylpropylenediamine, dimethylbenzylamine, and the like.

A surface-active agent is generally necessary for production of high grade polyurethane foam according to the present invention, since in the absence of same, the foams collapse or contain very large uneven cells. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate ethers, alkylsulfonic esters, and alkylarylsulfonic acids.

The following examples illustrate the nature of the invention. All parts are by weight unless otherwise stated. In the examples, the flame retardancy of the foam samples was determined by employing the California Bulletin No. 117 flame test. The specifications to pass this test are: after-flame, maximum 10 seconds, average $\leq 5$ seconds; char length, maximum 8 inches, average $\leq 6$ inches. Those foams which passed the average after-flame and char length specifications also passed the maximum after-flame and char length requirements. There is also an afterglow requirement in the test. None of the foams in the examples exhibited afterglow.

Polyol A is a graft polymer dispersion of 18% vinyl polymer content 1:1 acrylonitrile:styrene prepared by the in situ polymerization of an equal weight mixture of acrylonitrile and styrene in a polyol which is a propylene oxide, ethylene oxide adduct of glycerine containing 14 percent ethylene oxide and having a hydroxyl number of 47.

Polyol B is a graft polymer dispersion of 20% vinyl polymer content, 2:3 acrylonitrile:styrene prepared by the in situ polymerization of a 2:3 weight mixture of acrylonitrile to styrene in a polyol which is a propylene oxide ethylene oxide and allyl glycidyl ether adduct of glycerine, containing 9 percent ethylene oxide and having a hydroxyl number of 50.

Polyol C is similar to Polyol B except the acrylonitrile:styrene ratio is 1:1.

Polyol D is similar to Polyol B except the vinylic polymer content is 30 percent and a 3:1 ratio of acrylonitrile:styrene.

Polyol E is a graft polymer dispersion of 30 percent vinyl polymer content, 3:1 acrylonitrile:styrene prepared by the in situ polymerization of a 3:1 weight mixture of acrylontrile to styrene in a polyol which is a propylene oxide, ethylene oxide and allyl glycidyl ether adduct of a mixture of glycerine and propylene glycol containing a 14 percent ethylene oxide cap and having a hydroxyl number of 25.

Polyol F is similar to Polyol E except the acrylonitrile-styrene ratio is 1:1.

Polyol G is similar to Polyol D except the acrylonitrile:styrene ratio is 1:1.

Flame-Retardant A is FIREMASTER LVT-23P, a product of Velsicol Corp.

Flame-Retardant B is THERMOLIN 101, a product of Olin Corp.

Flame-Retardant C is PHOSGARD 2XC20, a product of Monsanto Corp.

Flame-Retardant D is ANTIBLAZE 78, a product of Mobil Corp.

Flame-Retardant E is PHOSGARD C-22-R, a product of Monsanto Corp.

EXAMPLES 1-5

A series of polyurethane foams was prepared by the following procedure:

To a one-quart capacity three and three-eights inch diameter cylindrical container and a turbine mixer fitted with a two inch diameter shrouded mixing turbine blade and operatively connected to a drill press was added: (1) 100 parts of the designated polyol; (2) 4.2 parts of water; (3) 1.2 parts of silicone surfactant; (4) 0.12 part of triethylene diamine; (5) 0.20 parts stannous octoate; (6) flame retardant and concentration as indicated; (7) sufficient toluene diisocyanate to bring the index to 110. The mixture without the toluene diisocyanate was stirred for about 10 seconds. The polyisocyanate was then added to the container and the resulting mixture was stirred for about 4 to 5 seconds. The content of the container was then immediately poured into a cardboard cake box and the foam was allowed to rise therein. After foam rise was completed, the resulting foam was air cured for at least 5 days. Table I sets forth the flame-retardant ingredients incorporated therein, the particle sizes and the types of polyols in preparing the foams as well as the results of the California Bulletin No. 117 flame test for each foam. Example 5 shows that a foam prepared from a polyol having a particle size of 0.3 does not pass the test even at 25 parts of flame retardant A.

TABLE I

| | | | | California No. 117 Flame Test | |
|---|---|---|---|---|---|
| Example | Polyol | Particle Size, microns | Flame/Parts Retardant/by Weight | Average After Flame in Seconds | Average Char Length in Inches |
| 1 | A | 0.65 | A/8 | 2.4 | 3.6 |
| 2 | B | 0.7 | A/8 | 2.4 | 3.7 |
| 3 | C | 0.7 | A/7 | 1.9 | 4.4 |
| 4 | C | 0.5 | A/10 | 3.9 | 4.3 |
| 5 | C | 0.3 | A/25 | 18.8 | 6.7 |
| | California No. 117 | | Flame Test Standard | 5 | 6 |

EXAMPLES 6-16

A series of polyurethane foams was prepared by a procedure similar to that employed in Examples 1-5 using the following formulation:

| Component | Parts by Weight |
|---|---|
| Polyol as designated below | 150 |
| Water | 6.3 |
| Silicone surfactant | 1.8 |
| Triethylene diamine | 0.18 |
| Stannous Octoate | 0.30 |
| TDI | 110 Index |
| Flame retardant | Variable |

Table II sets forth the polyols, the flame retardants, and the vinylic particle sizes incorporated in preparing the foams as well as the results of the California Bulletin No. 117 flame test for each.

TABLE II

| Example | Polyol | Particle Size, microns | Flame/Parts Retardant/by Weight | California No. 117 Flame Test | |
|---|---|---|---|---|---|
| | | | | Average After Flame in Seconds | Average Char Length in Inches |
| 6 | D | 0.85 | B/15 | 0.3 | 2.7 |
| 7 | D | 0.5 | B/23 | 2.7 | 3.2 |
| 8 | D | 0.25 | D/10 | 20 | 12 |
| 9 | D | 0.85 | D/10 | 1.8 | 3.6 |
| 10 | D | 0.25 | E/10 | 17.5 | 12 |
| 11 | D | 0.85 | E/10 | 0.0 | 2.2 |
| 12 | C | 0.25 | C/10 | 17.6 | 12 |
| 13 | G | 0.80 | C/10 | 0.9 | 3.3 |
| 14 | C | 0.25 | D/10 | 24.6 | 12 |
| 15 | G | 0.80 | D/10 | 1.7 | 2.6 |
| 16 | C | 0.60 | B/15 | 1.8 | 1.8 |
| | California No. 117 | | Flame Test Standard | 5 | 6 |

EXAMPLES 17-20

High resiliency polyurethane foams were prepared by a procedure similar to that employed in Examples 1-16 using the following formulation:

| Component | Parts by Weight |
|---|---|
| Polyol as designated below | 100 |
| Water | 4.2 |
| N,N-diethanolamine | 0.80 |
| Silicone surfactant | 0.90 |
| Triethylene diamine | 0.12 |
| Bis(2-dimethylaminoethyl)ether | 0.042 |
| Dibutyltin dilaurate | 0.05 |
| TDI | 110 index |
| Flame retardant | variable |

TABLE III

| Example | Polyol | Particle Size, microns | Flame/Parts Retardant/by Weight | California No. 117 Flame Test | |
|---|---|---|---|---|---|
| | | | | Average After Flame in Seconds | Average Char Length in Inches |
| 17 | E | 0.25 | B/8 | 54.6 | 12 |
| 18 | E | 0.36 | B/6 | 30.5 | 12 |
| 19 | E | 0.55 | B/1 | 2.8 | 1.5 |
| 20 | F | 0.80 | B/2 | 1.3 | 1.8 |
| | California No. 117 | | Flame Test Standard | 5 | 6 |

The embodiments of the invention in which an exclusive privilege or property is claimed are defined as follows:

1. In the preparation of a flame-retardant, flexible polyurethane foam prepared from the reaction of a polyoxyalkylene polyether polyol having an average equivalent weight of from 200 to 2500 and graft polymer content of at least 5 parts by weight per 100 parts by weight of said polyol, an organic polyisocyanate, a blowing agent and flame-retardant compounds, the improvement comprises incorporating therein a graft polymer having a particle size greater than 0.5 micron.

2. In the preparation of the flame-retardant flexible polyurethane foam of claim 1, the flame-retardant compound is selected from the group consisting of bis-(2-chloroethyl)-2-chloroethylphosphonate, tris-2,3-dibromopropyl)phosphate, tetrakis-(2-chloroethyl)ethylene diphosphate and compounds having the formulas

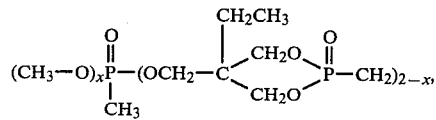

wherein x is equal to 0 or 1;

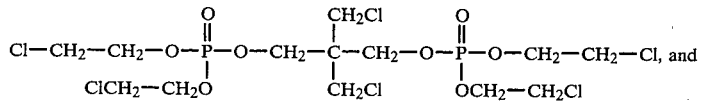

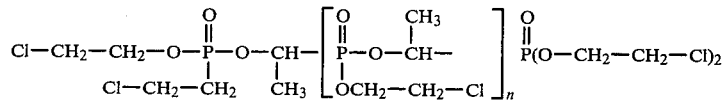

wherein n is 1 to 4.

3. In the preparation of the flame-retardant flexible polyurethane foam of claim 1, the amount of flame retardant compound ranges from 0.25 part to 25 parts per 100 parts of the polyol.

4. In a flame-retardant, flexible, high-resiliency polyurethane foam prepared by the reaction of a polyoxyalkylene polyether polyol having an average equivalent weight of from 200 to 2500, and a graft polymer dispersion content of at least 3 parts by weight per 100 parts of polyol, flame retardant compounds, and an organic polyisocyanate in the presence of a blowing agent, the improvement comprises incorporating therein a graft polymer having a particle size greater than 0.5 micron.

5. The flame-retardant flexible high-resiliency polyurethane foam of claim 4 wherein the amount of flame-retardant compound ranges from 0.25 part to 10 parts by weight per 100 parts of polyol.

6. The polyurethane foam of claim 4, wherein the flame-retardant compound is selected from the group consisting of bis-(2-chloroethyl)-2-chloroethylphosphonate, tris-(2,3-dibromopropyl)phosphate, tetrakis-(2-chloroethyl)ethylene diphosphate and compounds having the formulas:

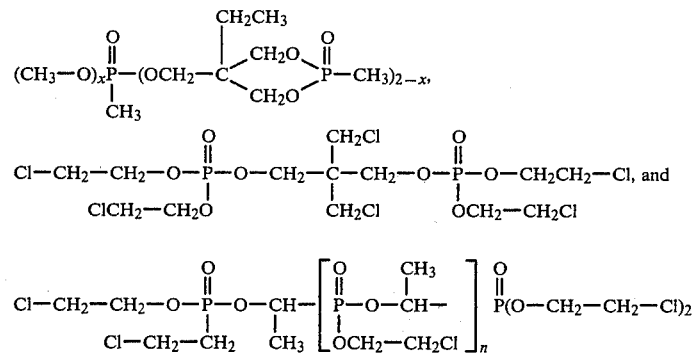

wherein n is 1 to 4.